United States Patent [19]

Klose et al.

[11] 4,360,579

[45] Nov. 23, 1982

[54] APPARATUS FOR PREVENTING FOGGING OF INTERMEDIATE FILM IN MICROFICHE RECORDING SYSTEMS

[75] Inventors: Peter Klose, Troy; Herbert Ovshinsky, Oak Park, both of Mich.

[73] Assignee: Energy Conversion Devices, Inc., Troy, Mich.

[21] Appl. No.: 207,229

[22] Filed: Nov. 17, 1980

[51] Int. Cl.$^3$ .......................... G03C 1/76; G03C 3/02
[52] U.S. Cl. ........................................ 430/8; 430/500; 430/501; 430/644; 352/236; 355/123
[58] Field of Search .................. 430/8, 394, 395, 396, 430/500, 501, 644, 951; 352/239, 236; 355/96, 99, 102, 125, 121, 123

[56] References Cited

U.S. PATENT DOCUMENTS

| 702,575 | 6/1902 | Maulick | 430/501 |
|---|---|---|---|
| 1,250,099 | 12/1917 | Davis | 430/496 |
| 1,588,869 | 6/1926 | Wolk | 430/501 |
| 2,582,004 | 1/1952 | Capstaff | 430/934 |
| 3,355,292 | 11/1967 | White | 352/239 |
| 3,635,712 | 1/1972 | Pfluke | 430/8 |
| 3,635,782 | 1/1972 | Kuhns | 430/496 |
| 4,116,694 | 9/1978 | Byers | 430/5 |
| 4,137,078 | 1/1979 | Izu | 430/322 |

FOREIGN PATENT DOCUMENTS

| 18124 | 1/1935 | Australia | 430/501 |
|---|---|---|---|
| 421877 | 1/1935 | United Kingdom | 430/496 |

OTHER PUBLICATIONS

Stevens, *The Photographic Journal*, Oct. 1963, pp. 277–286, "Technological Applications of Microphotographic Processes".

*Primary Examiner*—Mary F. Downey
*Attorney, Agent, or Firm*—Lawrence G. Norris

[57] ABSTRACT

An apparatus and methods for producing a transmission barrier for inhibiting propagation of light into still unimaged transparent portions of microfiche recording system intermediate film strips by light-piping action are described. The barrier serves to optically isolate the subsequently-to-be-imaged still unexposed portion of the film strip in a dispensing film head from the illumination used to transfer the previously developed image on the exposed portion of the strip onto a permanent recording medium, such as a microfiche film card. In one exemplary form of the invention, the barrier regions are photographically produced dark bands or lines between the longitudinally spaced areas of the film strip to be imaged. These bands or lines are preferably created as latent images during the initial exposure of the intermediate film and subsequently developed at the same time as the record image. Alternative embodiments include placing bands or lines of light absorbing material on the film strip or by serrating or otherwise locally deforming the intermediate film strip to produce the barrier regions, the serrations serving to spoil total internal reflection in the film. Long term fogging of the film by normal ambient light is dealt with by providing an automatic film payout feature. Particular applications to archival microfiche systems involving the intermediate film strip carrying a transferable image are described. An apparatus for using pre-formed barriers on the film strip to regulate film advance is described.

16 Claims, 19 Drawing Figures

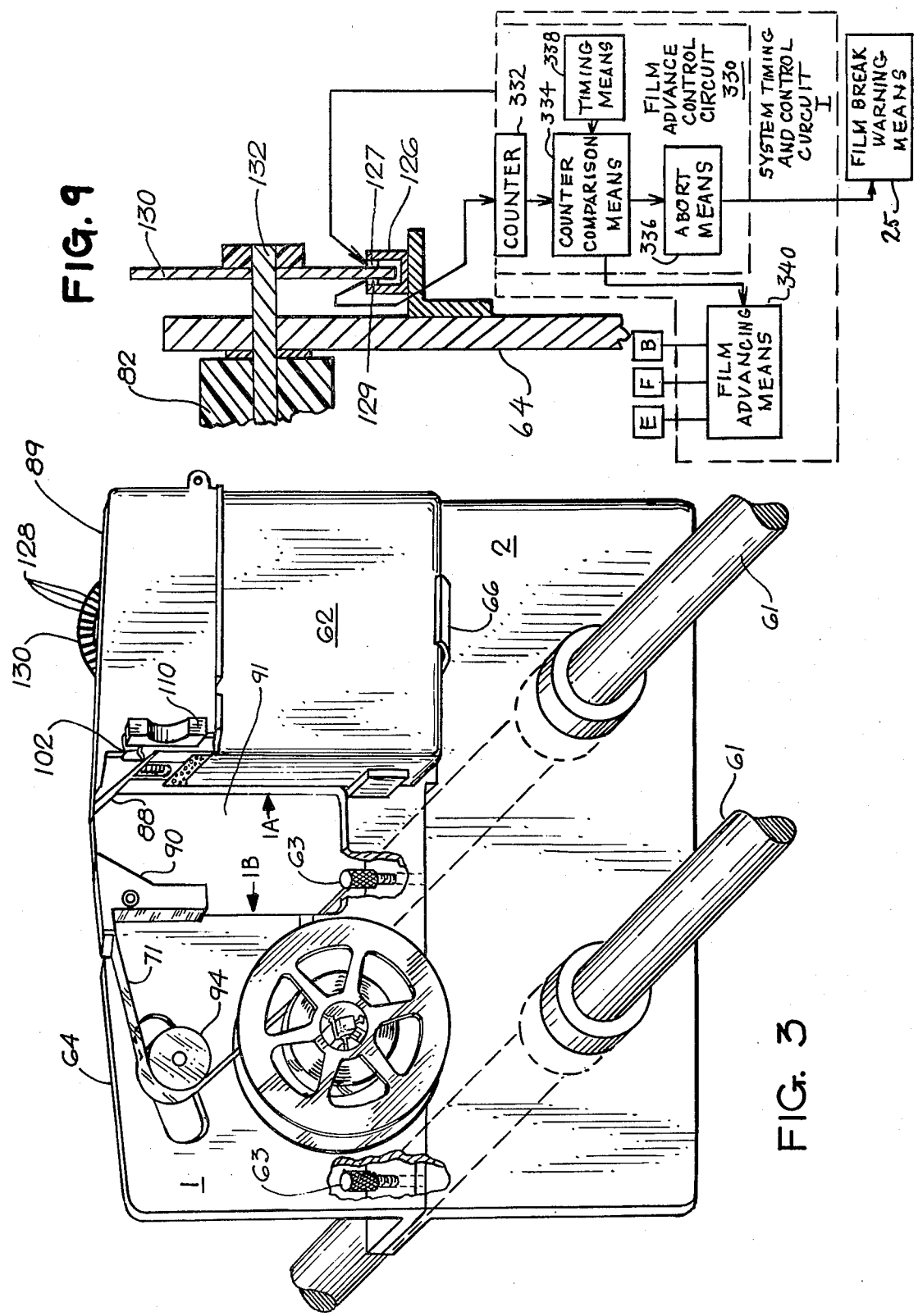

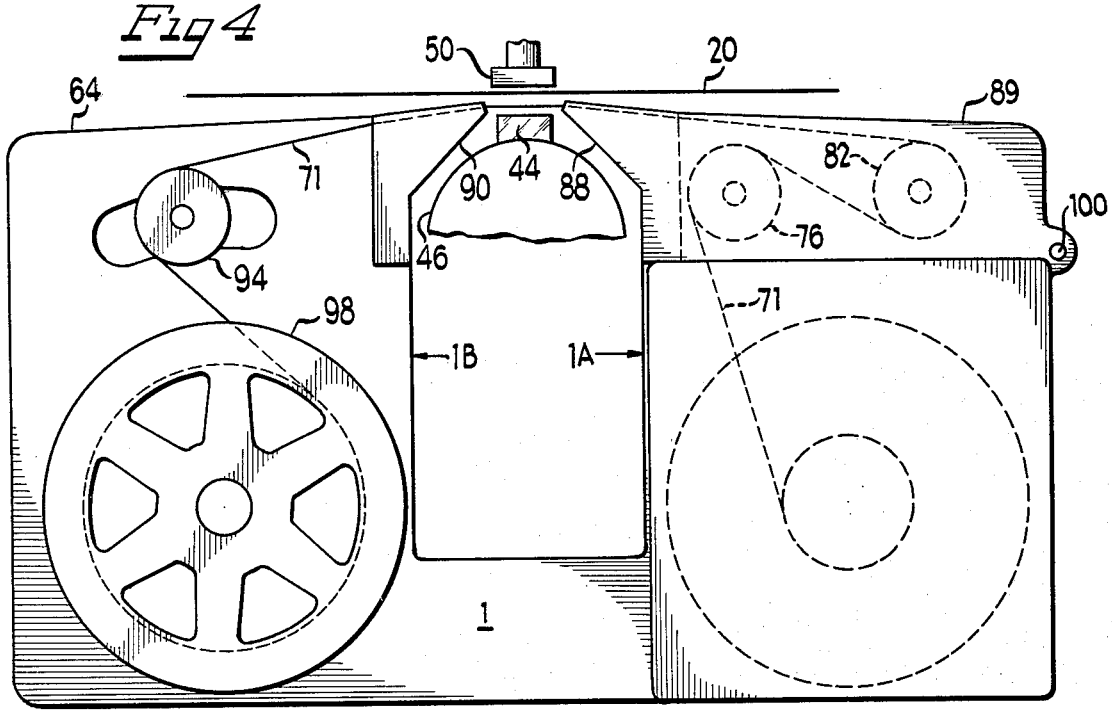
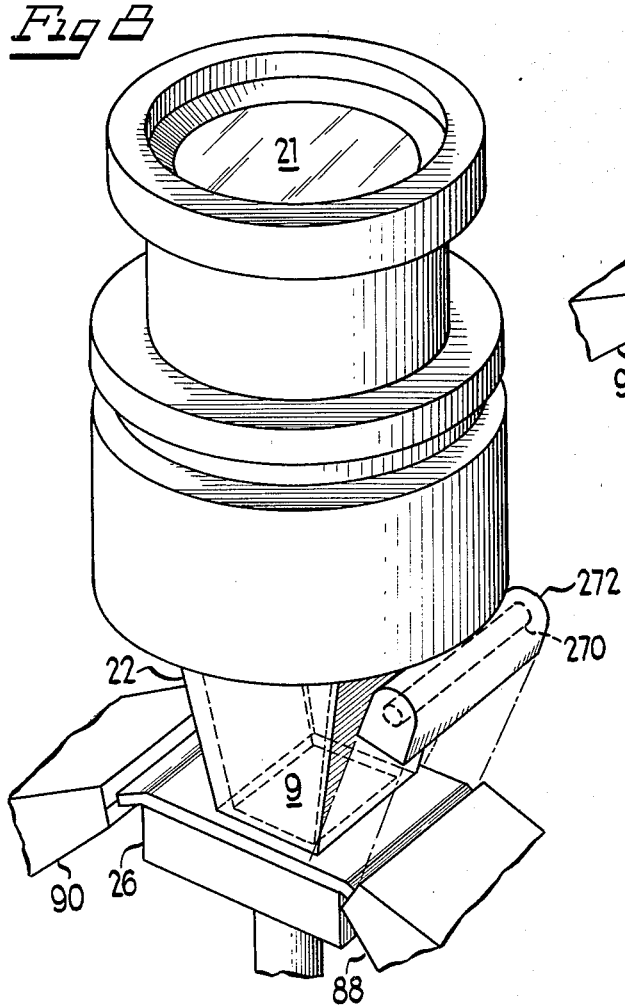
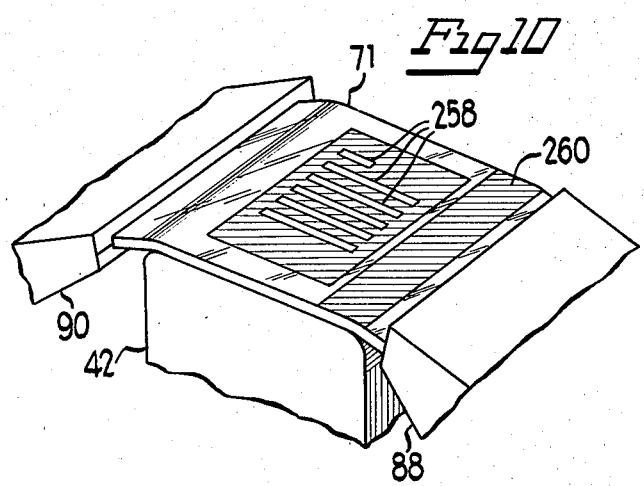

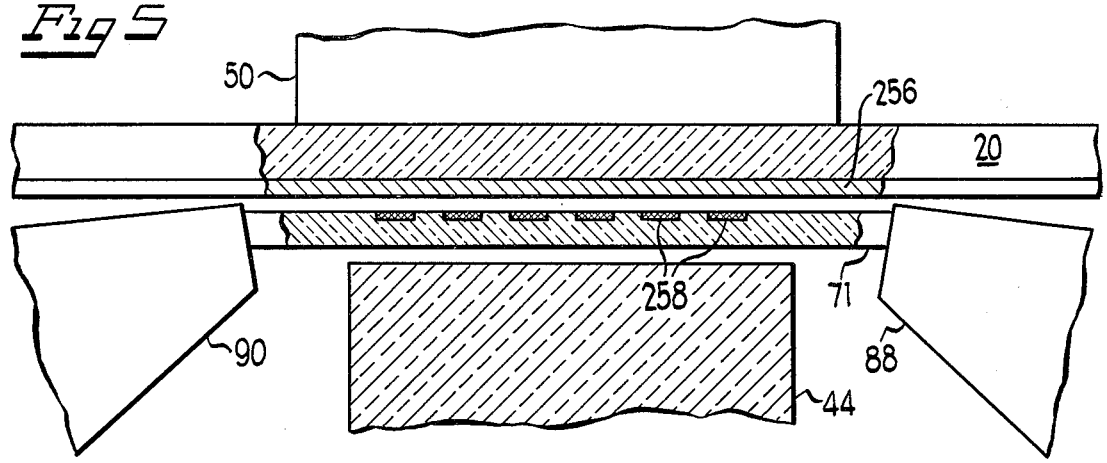
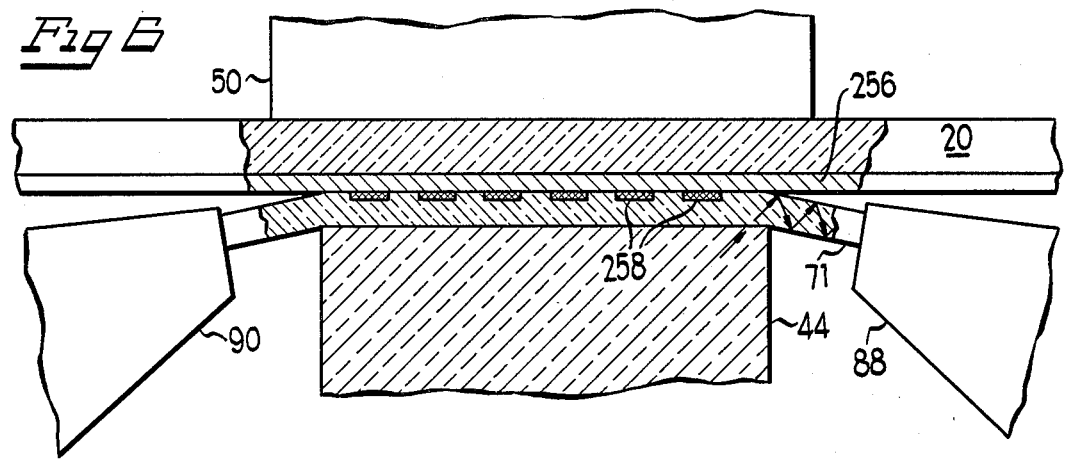
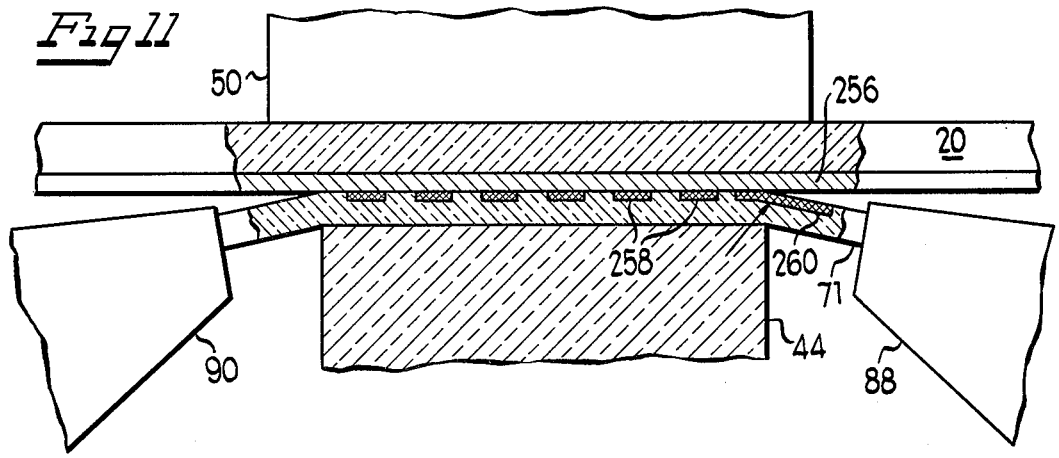

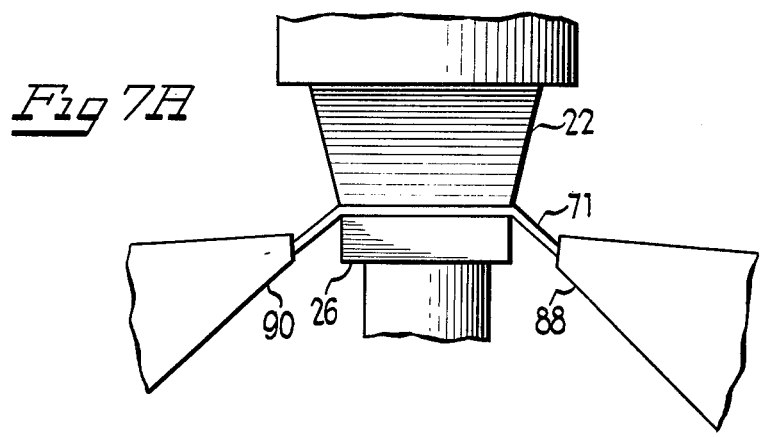
Fig 7A
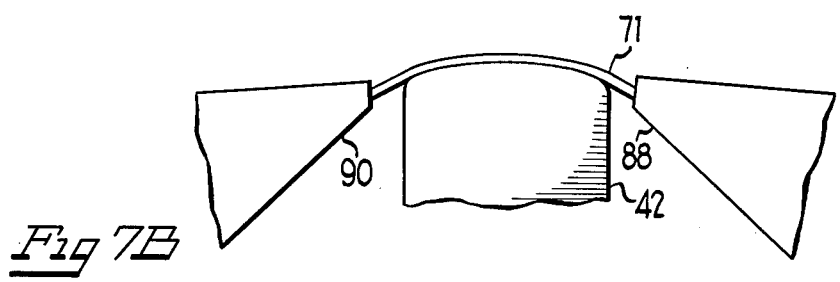
Fig 7B
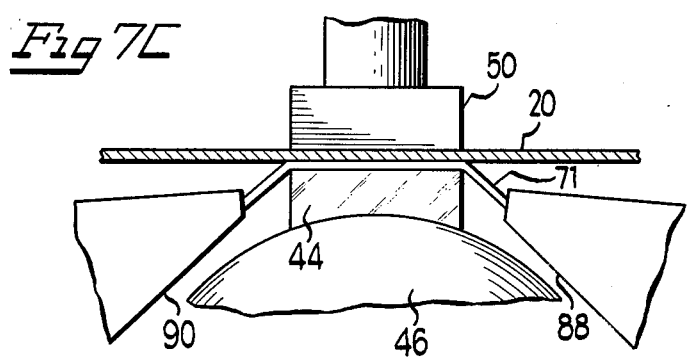
Fig 7C
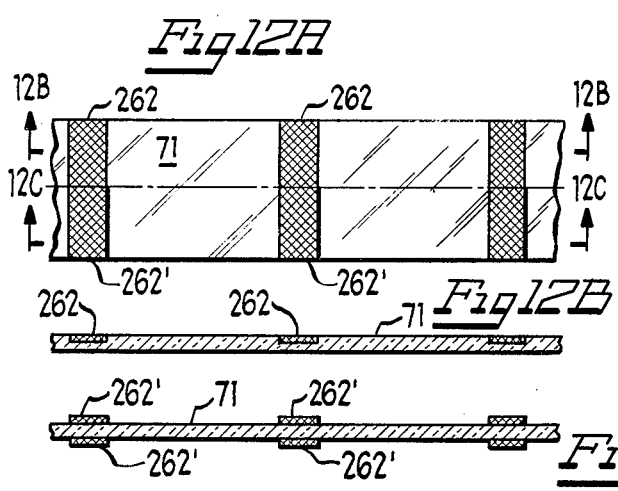
Fig 12A
Fig 12B
Fig 12C
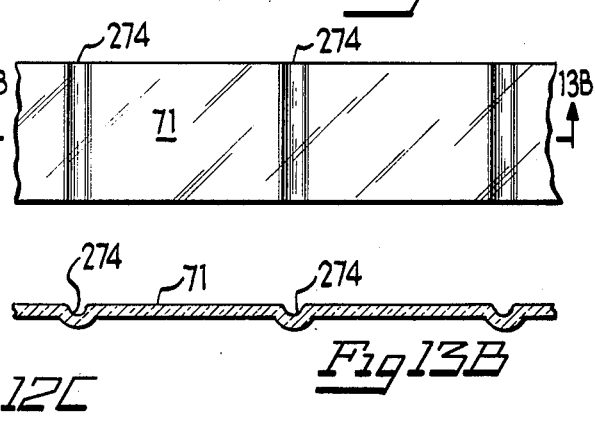
Fig 13A
Fig 13B

APPARATUS FOR PREVENTING FOGGING OF INTERMEDIATE FILM IN MICROFICHE RECORDING SYSTEMS

BACKGROUND OF THE INVENTION

The present invention relates to apparatus for preventing light fogging of unexposed photographic film in its dispenser, particularly as encountered in archival microfiche film systems employing an intermediate film strip to carry a transferable image.

There has been developed by the applicants and co-workers an archival hard copy microfiche recording system which reflects light off of a document placed on a document-receiving platform and projects an image of it in greatly reduced form onto an initially transparent intermediate dry silver film strip carried by a film head unit. The film strip is dispensed from a cassette mounted on the film head, and is fed by film advancing means to an imaging region where a selected area of the film strip to be exposed can receive the projected light image. A pressure element presses the selected area of the film strip against a planar backing aperture defining a projection plane and an imaging area, and the film is then exposed to the light image. The film head is next moved along guides from the imaging station to a developing station, where a hot shoe pressing against the exposed area of the film causes development of the image to form an opaque image in the exposed areas thereof. The film head is then moved to an image transfer station, where the image on the dry silver film is to be replicated on a positive initially opaque microfiche film card of the photo-developing type (See U.S. Pat. No. 4,137,078 issued June 30, 1979 to Izu and Ovshinsky). The microfiche card is held indexed on a movable carriage so that a predesignated frame of the card receives the image on the intermediate film. A pressure element presses the film card and the intermediate film strip together between the output prism of a flash lamp housing and a backing plate. Image transfer is accomplished by triggering the flash lamp to direct light through the intermediate film, immediately rendering transparent the previously opaque areas struck by the high intensity flash lamp light on the selected frame of the microfiche film card. To replicate a new image the film head is returned to the imaging station, where the cycle is repeated.

The microfiche film cards are of the threshold photodeveloping type, and require a relatively high radiant flux for complete exposure compared to the dry-silver intermediate film used. The transfer of the intermediate film image to the microfiche film is done by contact printing, using a high intensity flash lamp. A fraction of this illumination becomes trapped in the intermediate film, which is quite clear in unexposed regions, and proceeds to propagate laterally internally along the plane of the film by total internal reflection (light-piping), thereby making its way into unexposed film in the payout region of the film dispenser. A significant length of intermediate film thus becomes light struck in the film dispenser. This necessitates a long film advance between successive frames, and is thus wasteful of film.

This phenomenon is not significant during formation of the initial image because the requisite illumination level is much lower than for the transfer operation, owing to the relatively high speed of the intermediate film compared to the microfiche film. During the transfer operation the intermediate film is subjected to an illumination level several orders of magnitude higher than necessary for initial image formation, and the propagation of a small fraction of this by light-piping is sufficient to give rise to significant fogging effects.

Additionally, the intermediate film is similarly fogged by prolonged exposure of the cassette to the ambient light of the system. It is an object of this invention to protect the microfiche record against the effects of fogging from both sources.

SUMMARY OF THE INVENTION

In accordance with one of the features of the invention, in a archival microfiche recording system like that previously described, barrier regions are formed in or on the intermediate film strip between the film strip portion extended to receive the image of the record copy and the adjacent shielded film dispenser so as to hinder propagation of light or other film exposing energy from access to the unexposed film supply by light-piping action in the film strip.

In accordance with a specific feature of the invention the film is provided during manufacture with propagation barriers in the form of local permanent mechanical deformations that destroy local planarity of the film and thus spoil light-piping action.

In accordance with another specific feature of the invention such barriers are formed during film manufacture by placing a stripe of opaque ink or similar material on the surface of the film during manufacture, the stripe layer serving to uncouple the light from the film and into the absorbing layer.

In accordance with another specific feature of the invention, the barriers are formed during film manufacture by locally exposing stripe regions and locally developing them, leaving the intermediate film areas unexposed.

In accordance with another specific feature of the invention the barriers are produced photographically between the film dispenser and the freshly paid out film positioned to receive its image of the record copy. This is accomplished by a local illumination of the chosen barrier region, most advantageously at the imaging station, producing a latent image which may be developed at the same time as the image of the record copy. The resulting dark region between the developed image of the record copy and the film dispenser serves as a propagation barrier.

In accordance with another feature of the invention opaque barrier stripes formed during film manufacture are used to regulate film advance in conjunction with photosensing means.

In accordance with another feature of the invention a fogging problem arising from exposing the dispenser to ambient light is dealt with by automatically advancing from the film dispenser a sufficient length of fresh film that a fog-free film element is presented, said extra advance being automatically initiated by control means responsive to either opening the recording system access door or turning on the system power supply.

Other objects, features, and advantages of the invention will become apparent upon making reference to the specification to follow, the drawings, and the claims.

DESCRIPTION OF DRAWINGS

FIG. 3 is a perspective view of the traveling film head and a carriage therefor movably mounted on guides;

FIG. 4 is a front elevation of the film head, showing its position in relation to the microfiche film card, the flash housing, and a backing element when positioned at the transfer station;

FIG. 5 is an expanded front elevation of the imaging area of FIG. 4 in the immediate vicinity of the flash housing and backing element, with the microfiche film card and the intermediate film strip shown partially sectioned;

FIG. 6 shows the same region with the flash housing, intermediate film, microfiche film card, and backing element in pressure contact for image transfer, and shows the light-piping propagation of light from the flash unit into the dispensing region;

FIGS. 7A–7C are elevational views of the imaging region between the payout and takeup lips of the intermediate film head of FIG. 2 at the imaging, developing, and transfer stations;

FIG. 8 is a perspective view of the exemplary form of the invention, with a light source illuminating a strip of the intermediate film during the imaging process at the imaging station;

FIG. 9 is a cross sectional elevation of the film movement sensor and encoder wheel assembly, along with a block diagram of the associated control circuitry;

FIG. 10 is a perspective view of the developed image on the intermediate film after development by the hot shoe, and shows the exposed barrier band created on the film strip;

FIG. 11 is the view shown in FIG. 6, but with the barrier band positioned over the flash housing so as to inhibit the propagation of flash lamp light into film stored in the dispensing region;

FIG. 12A is a top plan view of the intermediate film strip with pre-formed barrier stripes;

FIG. 12B is a cross-sectional elevation of FIG. 12A showing photographically pre-formed barrier stripes;

FIG. 12C is a cross-sectional elevation of FIG. 12A showing lacquer or ink barrier stripes on the surfaces of the film strip;

FIGS. 13A and 13B are top plan views and cross-sectional side elevations, respectively, of a film strip with barrier stripes in the form of serrations.

DESCRIPTION OF EXEMPLARY FORM OF THE INVENTION

Figure 1:
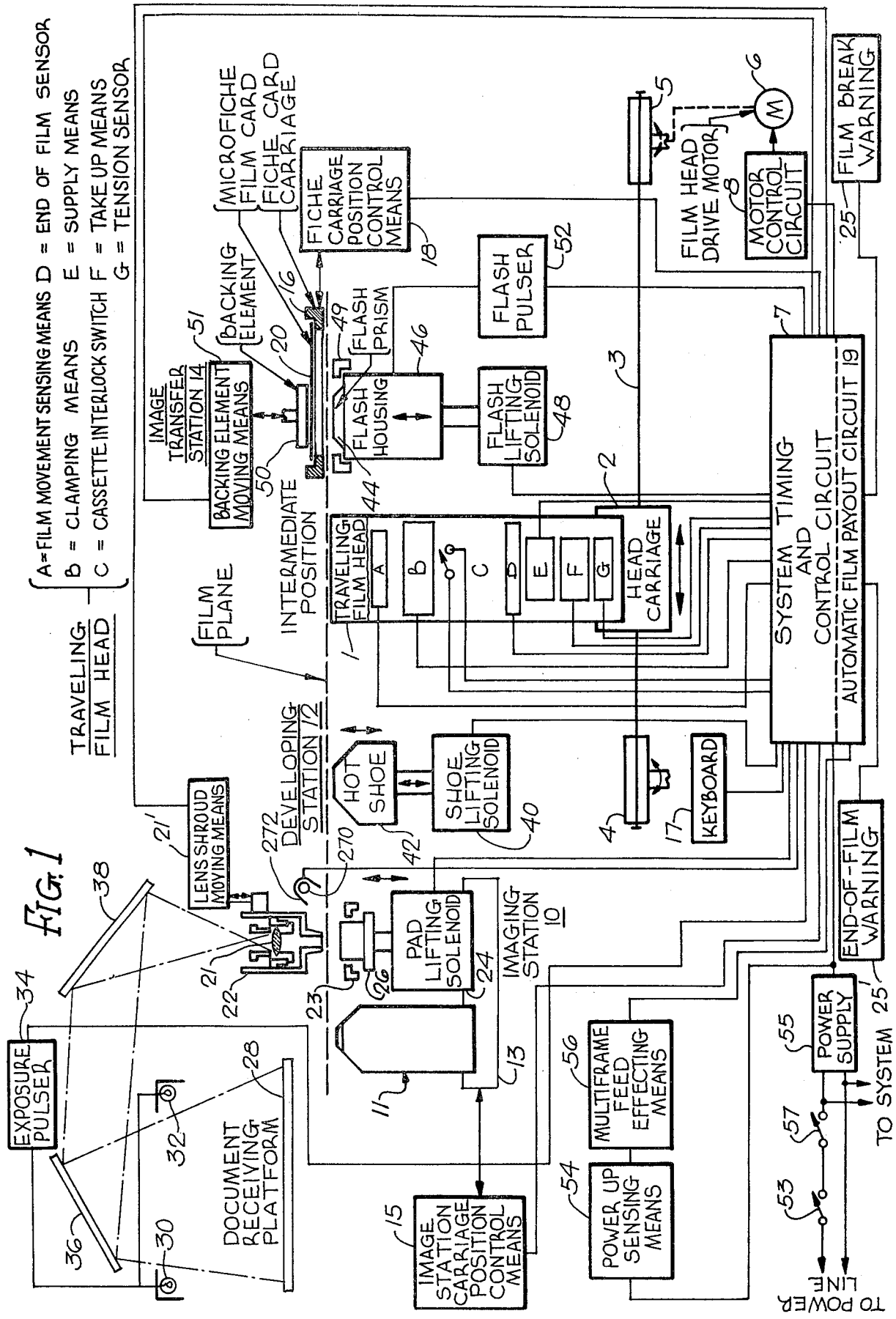
FIG. 1 is a block diagram of the control circuitry of the microfiche recording system.

FIG. 1 includes a block diagram of the control system for sequencing the operation and movement of an intermediate film head 1 and head carriage 2 between various stations of a microfiche recording system. The head carriage is advanced to the various stations illustrated in FIG. 1 by tension in a belt 3 extending between an idler pulley 4 and a motor driven pulley 5. A pulley drive motor 6 is controllably driven in both directions by a system timing and control circuit 7 operating through a motor control circuit 8. The stations illustrated are an imaging station 10, where the exposed area of the initially transparent intermediate film strip on the film head 1 is exposed to a light image, such as light reflected off of a hard copy, a heat-applying developing station 12 where the light-exposed areas of the intermediate film are rendered opaque, and an image transfer station 14. A microfiche film card carriage 16 at the image transfer station 14 positions, under control of a fiche carriage position control means 18, a selected frame of a microfiche film card 20 for reception of an image last formed on the film strip carried by the film head 1. The microfiche film card 20 is preferably made from a photo-developing initially opaque archival film of the dispersal type disclosed in U.S. Pat. No. 4,137,078 issued to Izu and Ovshinsky, wherein a transferred image is formed upon exposure to a high intensity flash of radiant energy, such film being completely insensitive to exposure to normal room ambient light or even direct sunlight. The film carried by the film head is preferably more light sensitive and is latently imaged by the relatively less intense light reflected and imaged from hard copy. The intermediate film carried by the film head is preferably a dry-silver heat-developed film. Throughout this text the term film is used to denote a substrate carrying a photosensitive layer.

As used herein, the term film head refers to a frame removably attached to a carriage, and a film supply unit removably mountable on the frame. The film head 1 carries a film supply means E, a film takeup means F, and a film clamping or holding means B. In various embodiments of the invention all three are sequentially controlled by the system timing and control circuit 7. For example, the supply means E may include a supply reel or cassette, and various guide rollers as well as film driving means where the supply reel is to be driven. The takeup means F may include a takeup reel and guide roller means as well as film tensioning means and takeup reel drive means. In addition, the film head may include an end-of-film sensor D which may respond to a marking on the film. The film head may also include a tension sensor G responsive to tension in the film. The end-of-film sensor D and tension sensor G perform control functions which respond to end-of-film or film breakage and disable operation of the system under these circumstances. A film break warning means 25 and an end-of-film warning means 25' serve to warn the operator of such situations. The film head 1 may also include a film head interlock switch C which communicates the status of a light sealed film dispenser cover to the system timing and control circuit 7, so that the system cannot be operated with the cover open and the film inside thus subject to light fogging.

Initially, the film head 1 is moved to the imaging station 10, where an imaging area of the film strip is placed under a projection lens 21 contained in a lens shroud 22 (see FIG. 7A). The film clamping means B is actuated to a film release condition and an area of fresh intermediate film strip is advanced into the imaging area by driving the supply or takeup means E or F. Payout length is governed by the film movement sensing means A, which effects generation of electrical signals measuring the length of film payout to the system timing and control circuit 7. In the exemplary form of the invention the film movement sensing means A effects generation of a series of pulses as the film advances, the number of which measures the payout length. After the requisite film advance, the system timing and control circuit 7 stops driving of the film supply or takeup means E or F and actuates the clamping or holding means B back to a film holding condition, whereupon a signal from the system timing and control circuit 7 raises a backing pad 26 up against a pad limit stop 23. A subsequent command from the system timing and control circuit 7 actuates a lens shroud moving means 21' to lower the lens shroud 22 to clamp the intermediate film between the backing pad 26 and the base of the lens shroud 22. A document receiving platform 28 is next illuminated by flash lamps 30 and 32 energized by the exposure pulser 34 on command from the system timing and control circuit 7, the image of the platform and its contents being relayed to the projection lens 21 by two mirrors 36 and 38. On command, the pad lifting solenoid 24 drops the pressure pad 26, and the lens shroud moving means 21' lifts the lens shroud 22, thereby releasing the film. The film head 1 is now moved to a developing station 12, where a shoe lifting solenoid 40 controlled by the system timing and control circuit 7 raises a hot shoe 42 (see FIG. 7B) against the imaging area 9 (see FIG. 2) of the film strip 71 for a predetermined length of time set by the system timing and control circuit 7, whereupon the shoe lifting solenoid 40 drops the hot shoe. The film head 1 is then moved to a position which places the imaging area 9 of the film strip over a flash prism 44 on a flash housing 46. A selected frame of a microfiche film card 20 on a microfiche card carriage 16 is moved into appropriate position over the flash housing 46 with the system timing and control circuit 7 controlling the microfiche carriage position control means 18. The desired frame of the microfiche film card 20 is selected by operation of keys of a keyboard 17 which cause the control circuit 7 to operate the microfiche carriage position control means 18. On command of the system timing and control circuit 7, a flash lifting solenoid 48 raises the flash housing 46 against a limit stop 49. A backing element 50 is lowered by the backing element moving means 51 so as to press the imaging area of the intermediate film strip into intimate contact with the microfiche film card 20 and a backing element 50 (see FIG. 7C). Image transfer is achieved by triggering the flash tube (not shown) in the flash housing 46 by a command from the system timing and control circuit 7 operating through a flash pulser circuit 52. Immediately after exposure, the lifting solenoid 48 drops the flash housing 46, and the backing element moving means 51 raises the element 50, thereby releasing the two films.

The pad lifting solenoid 24 and a projection light source 11 are mounted on an image station carriage 13. A station carriage position control means 15 is commanded by the system timing and control circuit to position either the pad lifting solenoid 24 or the projection light source 11 under the lens 21. For reading or updating a microfiche the fiche card carriage 16 is moved by the fiche carriage position control means 18 to a position under the lens 21, and the projection light source 11 is moved into position below it so as to project the image on the microfiche back onto the document receiving platform 28 for inspection and, where an add-on of information is to be made on the frame of the microfiche card involved, an overlay of the added information can be properly positioned over the projection image. The recording system carries out the desired recording and microfiche frame positioning operations as commanded by the operator by depressing the appropriate keys on a keyboard 17 connected to the system timing and control circuit 7. The system timing and control circuit is powered by a power supply 55 connected to the power line by a main power switch 53 and a system interlock switch.

To insure that the fresh intermediate film paid out during the film advance operation is not light fogged from prolonged exposure of the cassette to the ambient light in the system, the system timing and control circuit 7 commands the immediate advance of a preset number of frames of intermediate film every time the power switch 53 is turned on.

This is accomplished by program branching employing a routine microprocessor feature: a microprocessor forming part of the system timing and control circuit 7 responds to the onset of electrical power from the power supply 55 by automatically steering its program counter to an initialization routine stored in a "read-only" memory unit, which is also part of the system timing and control circuit. This steering is referred to as the "power-up reset" function, and is common to virtually all advanced micro-processors, such as the Zilog Z-80 and the Intel 8085. Functionally, this feature is shown outboard of the system timing and control circuit 7 in FIG. 1, and is labeled "power up sensing means 54"; however, it should be understood that the actual circuit means are part of the system timing and control circuit. The initialization routine commands the immediate advance of a preset number of frames of intermediate film, and is shown functionally in FIG. 1 as "multi-frame feed effecting means 56". This routine alters the program flow so as to cause normal signal sequencing of the supply means E, the takeup means F, and the clamping means B to recycle a preset number of times before normal program flow is resumed.

A similar fogging problem arises during the loading of a fresh film dispenser, since normal room light is much more intense than the ambient light in the system. A similar film advance is initiated by mounting a normally closed interlock switch 57 to a system access door (not shown). Opening the door to replace the intermediate film dispenser disconnects power from the system. Upon startup after loading the film advance routine is invoked as before.

Figure 2:
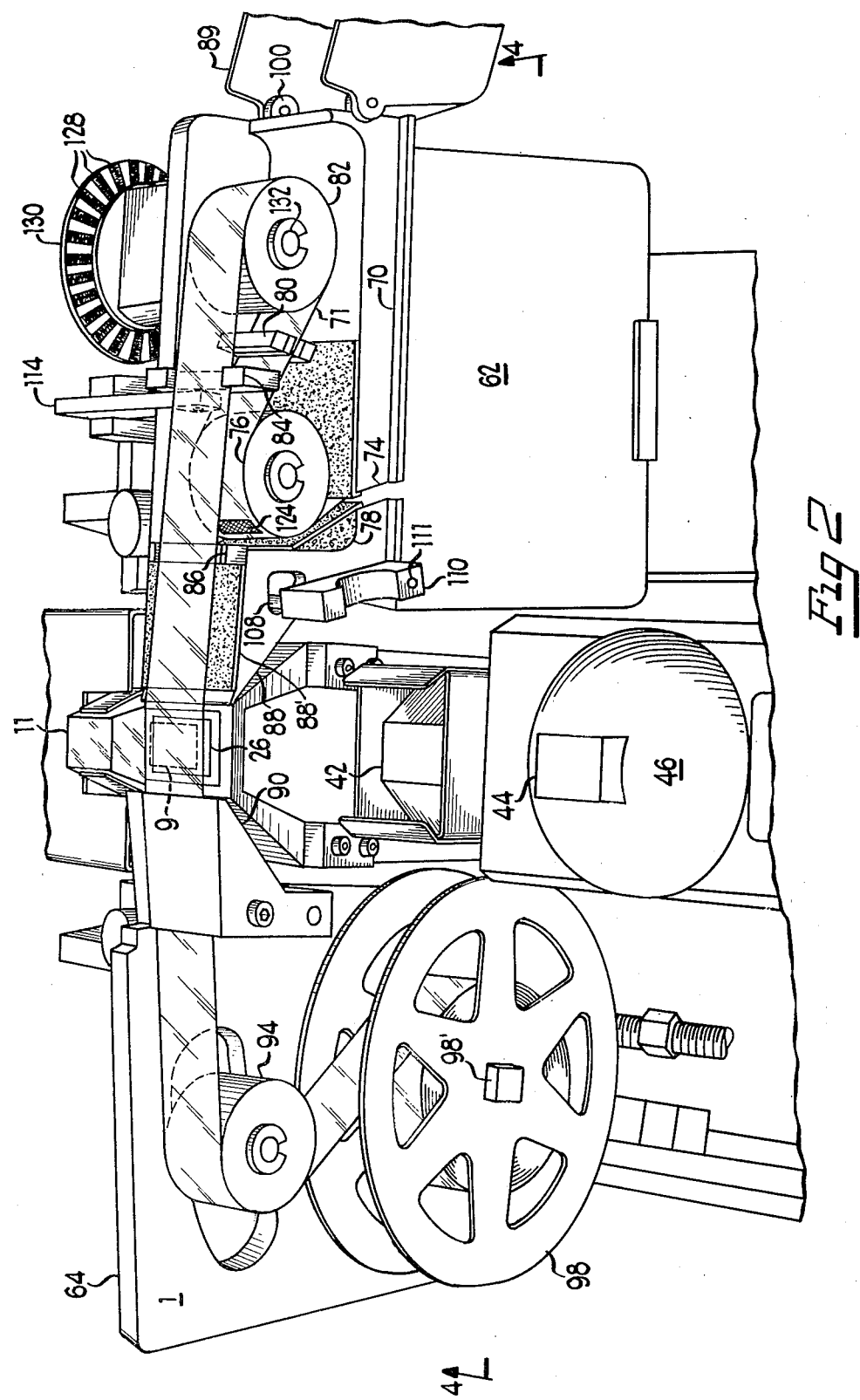
FIG. 2 is a perspective view of a traveling film head including an intermediate film dispensing cassette positioned at the imaging station with a film head cover in the open position to show details of the film dispensing system.

Refer now to FIGS. 2 and 3 which show the details of an exemplary film head 1. FIG. 3 shows the traveling film head 1 removably mounted as by screws 63 on the carriage 2 guided for horizontal movement on guide rods 61. FIG. 2 shows the film head positioned at the imaging station 10. The backing pad 26, the hot shoe 42, the flash prism 44, and the projection light source 11 are also shown. The film head is shown as including a film supply section 1A including a removable film dispensing cassette 62 mounted on a film head frame 64 and held in position by a cassette support ledge 66. The intermediate film strip 71 exits the cassette through a slot 74 in a top ledge 70, passing next around an idler roller 76 where it presses against a compliant friction pad 78 which places a drag force on the film, and thence through an end-of-film sensor unit 80. The film strip 71 then passes around an encoder roller 82 and back over a film clamp lifter 84, then over a clamping block 86 where it then exits the film supply section between a payout lip pad 88' and a pad (not shown) mounted on a film head cover 89 and over a payout lip 88, where one frame width of the film strip is exposed for external processing at what may be called an imaging area of the film head.

In this embodiment the film holding or clamping function is achieved by a short clamp blade (not shown)

mounted inside the cover 89. When the cover 89 is closed, the blade presses down on the film strip 71 to pin it to the clamping block 86. The cover 89 is tensioned down by a loading spring (not shown). Clamping release is achieved by a solenoid (not shown) drawing down the exterior end of a pivoted lift bar 114, thus raising the interior end of the lift bar carrying the film clamp lifter 84 so as to force the lifter into contact with the interior face of the cover 89 against the force of the loading spring. This raises the cover 89 sufficiently to raise the clamp blade out of its film engaging position, thereby releasing the film strip 71.

The frame 64 has a large open region 91 between the film supply section 1A and the film takeup section 1B of the film head. This open region receives the backing pad 26, hot shoe 42 and flash housing 46 at the imaging, developing and image transfer stations 10, 12 and 14. The film then passes over a takeup lip 90 on the takeup side of the imaging area and then proceeds over a dancing roller 94 carried on an arm 95 tensioned by a spring 93 which forces the roller away from the takeup lip 90, and serves to keep the film under tension. The film then winds on a motor driven takeup reel 98 driven by a takeup motor (not shown) mounted on the frame 64. The takeup reel 98 is mounted on a drive shaft 98' which makes connection to the motor in any suitable way, such as by a pulley belt coupling so that the entire film head 1 can be removed from the carriage 2, as by removing the screws 63—63 and raising the film head therefrom, where the film can be threaded through the film head conveniently away from the carriage.

FIG. 9 shows details of an intermediate film feed control means incorporated into the film head 1. Actuation of a film advancing means 340 in the system timing and control circuit 7 causes the intermediate film to advance under tension over the encoder roller 82 as previously described, causing the encoder roller to rotate. The advancing means 340 controls the sequencing of the supply means E, the takeup means F, and the clamping means B in FIG. 1. The rotation of the encoder roller 82 is detected by a light sensing unit 126 mounted on the frame 64, which monitors the passage of opaque interruptor lines 128 on a transparent encoder wheel 130 attached to the outboard end of the encoder roller shaft 132, the wheel, shaft, and roller being rigidly interconnected. The passage of a line 128 interrupts a light beam from a light source 127 to a photodetector 129. The series of light pulses detected by the light sensing unit is transmitted to the system timing and control circuit 7 as the intermediate film pays out over the encoder roller 82 during film advance. The pulses are counted by the system timing and control circuit 7. When the count reaches a predetermined value the system timing and control circuit 7 terminates power to the film advance motor (not shown), which drives the takeup reel 98. Film breakage during the film advance process causes loss of tension in the intermediate film 71, resulting in loss of friction contact between the film and the encoder roller 82. The encoder roller ceases to turn, and the sensing pulses cease as a result. Failure to generate the requisite number of pulses during a prescribed time interval is interpreted as a film break condition.

FIG. 9 further contains the related control circuitry to accomplish the foregoing in block diagram format. The film advance operation, like all other automatic sequencing operations carried out in the microfiche recording system, is governed by microprocessor execution of a stored program in read-only memory, both the microprocessor and the memory being integral to the system timing and control circuit 7. The light source 127 is energized by the system timing and control circuit 7 prior to film advance. A pulse from a film advance control circuit 330 within the system timing and control circuit 7 clears a pulse counter 332, preferably of the simple ripple type. The pulse counter 332 receives the output pulses from the photodetector 129 and proceeds to store the pulse count. During this period the stored program executes a conventional timing loop of duration somewhat in excess of that necessary to advance one frame, the program flow branching at regular intervals to sense the contents of the counter 332 by activating periodically a counter comparison means 334. The counter comparison means 334 preferably consists of replicating the current pulse count in the A register of the microprocessor and comparing it with a preset stored number equal to the number of photodetector pulses characterizing one frame. When the requisite count is detected film advance ceases, and the program branches out of the timing loop and normal program flow continues. If, however, the film breaks and the pulses cease, the requisite pulse count is never attained and the timing loop runs its full cycle, whereupon the program proceeds to actuate an abort means 336 which preferably consists of terminating program sequencing by entering a program "halt" state and actuating the film break warning means 25. The timing loop is shown functionally as "timing means" 338 in FIG. 9.

FIGS. 7A through 7C show plan views of the film head 1 in the region of the imaging area of the film head during image exposure (FIG. 7A), development (FIG. 7B), and image transfer (FIG. 7C). Since the intermediate film 71 is rigidly clamped internally on the payout side, the film is fixed in position at the payout lip 88. However, the compliant tensioning of the film by the spring loaded dancing roller 94 on the takeup side permits a slight film payout to take place on the takeup side as shown by arrows in FIGS. 7A, 7B, and 7C when the backing pad 26, hot shoe 42 and flash housing are raised into position. This prevents breakage of the intermediate film 71 under the forces involved. FIG. 4 is a front elevation of the film head 1, showing its position in relation to the microfiche film card 20, the flash housing 46, and the backing element 50 when the film head is positioned at the transfer station 14 of FIG. 1.

In addition to long-term exposure of the intermediate film strip 71 to ambient light, film fogging also occurs by light-piping action during the transfer operation. FIG. 4 shows the relationship of the film head 1, microfiche film card 20, flash housing 46, and backing element 50 when positioned at the transfer station 14. FIG. 5 shows a partially sectioned view of the imaging region between the payout lip 88 and the takeup lip 90 with the microfiche film card 20 in place below the backing element 50. The flash prism 44 is located immediately below the intermediate film strip 71. FIG. 6 shows the same region during image transfer, with the flash prism 44 pressing the assembly into contact. The emulsion layer of the film strip 71 is in proximate contact with the photodeveloping imaging layer 256 of the microfiche film card 20. Light from the flash prism 44 passes through the record indicia 258 to replicate them in the imaging layer. A fraction of this light is trapped in the clear areas of unexposed intermediate film, and proceeds by total internal reflection into the unexposed film as indicated by the arrows.

In the exemplary form of the invention a barrier region is created in the intermediate film 71 so as to interpose between the flash prism 44 and the payout lip 88 a means for significantly reducing this light-piping transmission. In the exemplary form of the invention this barrier is formed at the imaging station 10 (FIG. 1) by producing a photographically blackened band 260 (see FIG. 10) on the intermediate film strip 71. FIG. 8 shows a perspective view of the lens shroud 22, intermediate film 71 and backing pad 26 in position for imaging the archival record onto the film. The shroud 22 forms a light-tight seal of the film about the imaging region 9 (see also FIG. 2). A small lamp 270 actuated by the system timing and control circuit illuminates the film 71 between the shroud 22 and the payout lip 88. Collimation is achieved by means of a reflector 272. After exposure of the film 71 to the image of the archival record, both latent images are developed by the hot shoe 42, which subjects substantially the entire width of the imaging region between the payout lip 88 and the takeup lip 90 to the development process. FIG. 10 shows a developed film 71 bearing record indicia 258 and the blackened band 260.

FIG. 11 shows the banded film strip 71 in position for image transfer, as in FIG. 6. The band 260 now covers the edge of the flash prism 44. Light entering the banded region by light-piping from the flash lamp 44 must reflect internally off of the band of blackened silver emulsion 260 to enter the payout region 88, and suffers significant absorptive attenuation in doing so, thereby accomplishing one of the objects of the invention.

Other forms of transmission spoiling barrier regions may be formed such as by spoiling the local planarity of the surface of the film, as for example by a serrated roller timed to engage and emboss the film locally in the desired region, the disturbance of the surface causing the trapped light to escape through the serrations on the film. An example of intermediate film 71 with serrations 274 is shown in FIGS. 13A and 13B. Alternatively, the barrier strips may be pre-formed during the manufacture of the film itself. The film may be exposed to light in narrow regions and simultaneously heated by a narrow hot shoe to locally develop the image so formed. FIG. 12A is a top plan view of a strip of intermediate film 71 with pre-formed barrier stripes 262. FIG. 12B is a cross-sectional elevation of FIG. 12A showing photographically formed barrier stripes 262. Alternatively, the optical properties of the surface of the film may be altered by painting or otherwise depositing a stripe which destroys total internal reflection by optically coupling to the film and leading the light out into an absorbing region in the stripe. For increased light absorption efficiency such stripes may be positioned in opposing pairs on opposite faces of the film. FIG. 12C is a cross-sectional elevation of FIG. 12A showing this alternative form of barrier stripe 262'. A simple stripe of dark lacquer of conventional variety will accomplish this, as will many other substances. For best efficiency the index of refraction of the stripe material should equal that of the film so as to give maximum coupling efficiency.

Figure 14:
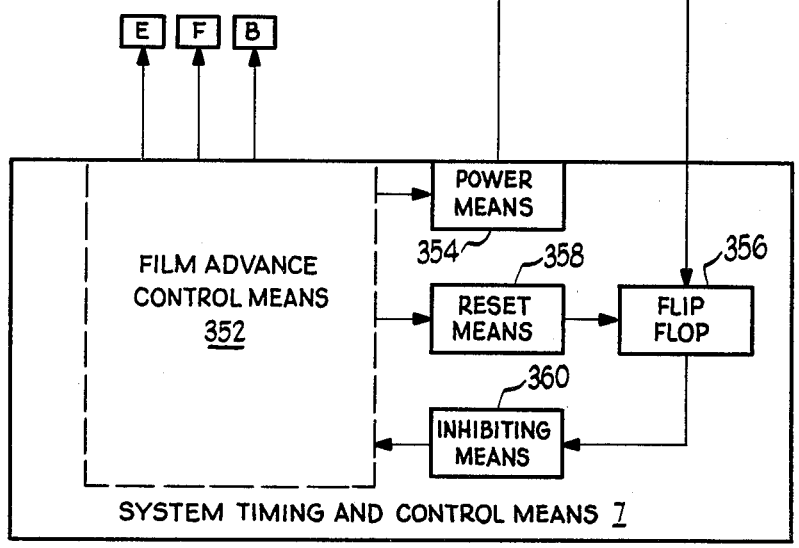
FIG. 14 is a front elevation of the imaging region between the payout and takeup lips of the intermediate film head of FIG. 2, showing film advance photoregulation means and the associated circuit functions in block diagram form.

Such pre-formed markings may also be used in conjunction with elementary photosensing means to regulate film advance. FIG. 14 shows one embodiment of such a system. A light source 344, preferably an infrared light emitting diode, is mounted on the film head cover 89. A light pipe 346 conducts the emitted light to illuminate the film strip 71 immediately adjacent to the edge of the payout lip 88. Light passing through the film strip is collected by a second light pipe 348 and conducted to a photodetector 350, preferably a phototransistor. Film advance is controlled by a film advance control means 352 in the system timing and control circuit 7, and is terminated when an opaque barrier stripe 262 is advanced to interrupt the light beam. The film advance control means 352 is under control of the minicomputer in the system timing and control circuit 7.

Immediately prior to actuating the film advance sequence of control signals to the film supply means E, the film takeup means F, and the film clamping means B (see FIG. 1), the film advance control means 352 actuates a power means 354 to power the light source 344, and resets a peripheral flip-flop 356 responsive to output signals from the photodetector 350. Functionally, this is shown as an interaction via a reset means 358; on the circuit level this is simply accomplished by sending a reset pulse to the flip-flop from the minicomputer. The flip-flop is of the conventional slope-triggered type, and is biased to output a "1" signal when it receives a "1-0" transition signal at its input. Thus, the flip-flop will output a signal only when the light beam received by the photodetector is undergoing a reduction in intensity, i.e. when a barrier stripe first moves across the light beam. The film advance sequence continues until this condition occurs, at which time the flip-flop output state changes from "0" to "1", causing an inhibiting means 360 to terminate the film advance sequence. In more detail, during film advance the stored program which governs the film advance sequence periodically branches to interrogate the status of the flip-flop. Upon sensing a "1" the film advance sequencing is terminated by program branching to continue the remaining system operations.

The photosensor assembly need not be positioned at the payout lip, but may alternatively be placed at any point in the film circuit where the passage of a barrier stripe signals the emergency of a barrier stripe from the payout lip 88. It should also be noted that the end-of-film mark 124 and photosensor 80 shown in FIG. 2 cannot be employed as shown to signal an incipient end-of-film condition, since the passage of a barrier stripe would be interpreted as the passage of the end-of-film marker. This problem may be solved by preparing the intermediate film with a clear trailing end without barrier stripes. Following the approach previously described using the encoder wheel 130 shown in FIG. 9, failure of a barrier stripe to pass the film advance photosensor unit during a preset time interval is interpreted by the system timing and control circuit 7 as a film break or end-of-film condition, resulting in an automatic abort of normal system sequencing and actuation of a suitable operator warning means. In such a system the interval photosensor 80 is either dispensed with entirely, or is positioned as previously described and serves as the film advance photosensor itself.

While for the purpose of illustration, various forms of this invention have been disclosed, other forms thereof may become apparent to those skilled in the art upon reference to this disclosure. For example, the barrier regions could be formed by a series of staggered film performations. This is a variation of the present invention developed by Mark H. McCormick-Goodhart subsequent to our invention. Therefore, this invention shall be limited only by the scope of the appended claims.

We claim:

1. A method for preventing light fogging of unexposed portions of an initially transparent film strip producing opaque imaged areas when imaged by imaging energy and contained within an imaging energy sealed portion of film support means from which a limited area of the film strip to be imaged is exposed to an external imaging energy region, comprising forming integral with the film strip in or on the film strip at least one propagation barrier region between each such limited area of the film strip to be imaged and the adjacent later to be exposed areas, each such barrier region having the property of inhibiting the propagation of said imaging energy into adjacent later to be exposed areas of said film strip by internal reflection of such energy between the opposite surfaces of the film.

2. The method of claim 1 wherein each of said propagation barrier regions is formed by permanent deformation of said film so it has one or more bends or deviations from local planarity therein interfering with light propagation within said film.

3. The method of claim 1 wherein each barrier region is formed by forming a radiant energy absorbing region on or in the film.

4. The method of claim 3 wherein each barrier region is formed by the photographic exposure of the chosen region involved followed by a local photographic development.

5. The method as recited in claim 1, 2, 3, or 4 wherein said barrier regions are pre-formed during the manufacture of said film strip.

6. A method for preventing light fogging of an intermediate film, having at least one exposed opaque portion and at least one unexposed transparent portion, during transfer of said image from said exposed portion to another film by subjecting said exposed portion to imaging energy for the transfer of said image comprising: forming prior to said image transfer, integral with said intermediate film in or on said film, at least one propagation barrier region disposed along the entire width of the intermediate film between said exposed portion and said unexposed transparent portion, each said barrier region inhibiting the propagation of said imaging energy into said unexposed portion by internal reflection to said imaging energy between the opposite surfaces of the film.

7. The method of claim 6 wherein each of said propagation barrier regions is formed by permanent deformation of said film so it has one or more bends or deviations from local planarity therein interferring with light propagation within said film.

8. The method of claim 6 wherein each of said propagation barrier regions is formed by forming a radiant energy absorbing region in or on said film.

9. The method of claim 8 wherein each of said propagation barrier region is formed by the photographic exposure of the chosen region involved followed by a local photographic development.

10. The method of claim 6, 7, 8 or 9 wherein said propagation barrier regions are pre-formed during the manufacture of said film strip.

11. The method of claim 6, 7, 8 or 9 wherein said propagation barrier regions are formed simultaneously with the exposure of said exposed opaque portion.

12. An improved photographic film strip for use in a microfiche recording system, said film strip comprising:
a film strip body having a photoactive layer, said film strip being exposable to a light image to form an image on a portion thereof, which image on said exposed portion of said film strip is transferable to microfiche film card by subjecting said exposed portion to radiant energy; and
a plurality of propagation barrier means integral with said film body on or in said film body, said barrier means being separated from each other along a portion of the length of said film strip body and disposed intermediate to longitudinally spaced imaging areas on said film strip body, each of said barrier means being disposed in a transverse direction extending across said film strip body to intercept light propagation by internal reflection through said film body towards unimaged areas of said film strip caused by said radiant energy transferring said image to said microfiche film card to inhibit fogging of said unimaged areas.

13. The film strip of claim 12 wherein each said barrier means comprises permanent bends or deviations from local planarity in said film strip body configured to substantially interfere with light-piping propagation in said film strip.

14. The film strip of claim 12 wherein each said barrier means comprises a reflection spoiling layer applied to at least one surface of said film strip body.

15. The film strip of claim 12 wherein each said barrier means comprises a locally exposed and developed transverse stripe area in the photoactive layer of said film strip.

16. The film strip of claim 12, 13, 14 or 15 wherein said photoactive layer is continuous with said film strip body.

* * * * *